US011411485B2

(12) United States Patent
P.V et al.

(10) Patent No.: US 11,411,485 B2
(45) Date of Patent: Aug. 9, 2022

(54) MULTI-DEGREE-OF-FREEDOM ELECTROMAGNETIC MACHINE

(71) Applicant: HONEYWELL INTERNATIONAL INC., Charlotte, NC (US)

(72) Inventors: Ramakrishna Rao P.V, Bangalore (IN); Varun Ananda, Bangalore (IN); Subhashree Rajagopal, Bangalore (IN); Govind Yadav, Bangalore (IN); Renukaprasad N, Bangalore (IN); Deepak Mahajan, Bangalore (IN); Sivanagamalleswara Bavisetti, Bangalore (IN); Jijo Thomas, Bangalore (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 88 days.

(21) Appl. No.: 17/092,507

(22) Filed: Nov. 9, 2020

(65) Prior Publication Data
US 2021/0234452 A1 Jul. 29, 2021

(30) Foreign Application Priority Data
Jan. 29, 2020 (IN) .............................. 202011003913

(51) Int. Cl.
*H02K 41/06* (2006.01)
(52) U.S. Cl.
CPC ....... *H02K 41/065* (2013.01); *H02K 2201/18* (2013.01)
(58) Field of Classification Search
CPC .. H02K 1/00; H02K 1/12; H02K 1/14; H02K 1/16; H02K 1/22; H02K 1/24; H02K 1/27; H02K 1/30; H02K 5/00; H02K 5/04; H02K 5/17; H02K 5/173; H02K 16/00; H02K 16/04; H02K 11/00; H02K 11/21;
(Continued)

(56) References Cited

U.S. PATENT DOCUMENTS 4,938,025 A * 7/1990 Larsen .................... F01C 9/005
60/519
5,280,225 A 1/1994 Pine et al.
(Continued)

FOREIGN PATENT DOCUMENTS

CN 102075042 A 5/2011
CN 202160025 U 3/2012
(Continued)

*Primary Examiner* — Tran N Nguyen
(74) *Attorney, Agent, or Firm* — Lorenz & Kopf, LLP

(57) ABSTRACT

A multi degree-of-freedom electromagnetic machine includes an outer case, an inner case, a stator, stator windings, a voice coil winding, a tilt magnet, a rotor, and rotor magnets. The inner case is disposed within an inner cavity of the outer case and is mounted to rotate relative to the outer case about one or more rotational axes. The stator is fixedly mounted within the inner case, and the stator windings are wound thereon. The voice coil winding is fixedly coupled to either the inner surface of the outer case or the outer surface of the inner case. The tilt magnet is fixedly coupled to either the outer surface of the inner case or the inner surface of the outer case. The rotor is rotationally mounted within the inner case and is operable to rotate, relative to the stator, about a rotational axis.

20 Claims, 11 Drawing Sheets

(58) Field of Classification Search
CPC ........ H02K 11/22; H02K 19/00; H02K 19/10;
H02K 41/00; H02K 41/02; H02K 41/03;
H02K 41/031; H02P 25/00; H02P 25/08;
G01B 11/00
USPC ................... 310/179–184, 114–118
See application file for complete search history.

(56) References Cited

U.S. PATENT DOCUMENTS

| | | | |
|---|---|---|---|
| 5,413,010 | A | 5/1995 | Nakanishi et al. |
| 6,664,666 | B2 | 12/2003 | Corcoran |
| 7,675,208 | B2 * | 3/2010 | Bandera ................. H02K 16/00 |
| | | | 310/80 |
| 9,391,481 | B2 | 7/2016 | Kim et al. |
| 2004/0232790 | A1 | 11/2004 | Mendenhall |
| 2014/0214162 | A1 * | 7/2014 | Smoot .................... G09B 23/30 |
| | | | 623/6.64 |

FOREIGN PATENT DOCUMENTS

| | | | | |
|---|---|---|---|---|
| CN | 102969849 | A | 3/2013 | |
| CN | 206117468 | * | 4/2017 | ............. H02K 37/12 |
| CN | 108494203 | A | 9/2018 | |
| CN | 108736657 | A | 11/2018 | |
| CN | 109728699 | A | 5/2019 | |
| FR | 3032570 | A1 | 8/2016 | |
| JP | 2006172846 | A | 6/2006 | |
| JP | 2007318896 | A | 12/2007 | |
| JP | 2012070522 | A | 4/2012 | |
| WO | 99/19971 | A1 | 4/1999 | |

\* cited by examiner

MULTI-DEGREE-OF-FREEDOM ELECTROMAGNETIC MACHINE

CROSS REFERENCE TO RELATED APPLICATION

The present application claims benefit of prior filed Indian Provisional Patent Application No. 202011003913, filed Jan. 29, 2020, which is hereby incorporated by reference herein in its entirety.

TECHNICAL FIELD

The present invention generally relates to electromagnetic machines, such as motors, and more particularly relates to multi-degree-of-freedom electromagnetic machines.

BACKGROUND

Recent developments in the field of UAV (Unmanned Aerial Vehicles), drones for unmanned air transport, robotics, office automation, and intelligent flexible manufacturing and assembly systems have necessitated the development of precision actuation systems with multiple degrees of freedom (DOF). Conventionally, applications that rely on multiple (DOF) motion have typically done so by using a separate motor/actuator for each axis, which results in complicated transmission systems and relatively heavy structures.

With the advent of spherical motors, there have been multiple attempts to replace the complicated multi-DOF assembly with a single spherical motor assembly. A typical spherical motor consists of a central sphere on which coils are wound, which may be orthogonally placed from each other. The sphere is surrounded by multi-pole magnets in the form of an open cylinder. The coil assembly is held axially and maintained in a vertical position via, for example, a metal post. The outer cylinder is held by a yoke/frame via a bearing, which allows the cylinder to be rotatable about its axis. The yoke is further connected to the metal post of the coil assembly via a second bearing, which allows the yoke, along with the cylinder, to be rotatable about one or two additional axes.

Unfortunately, current attempts to apply the spherical motor to the certain applications, such as UAVs and robotics, have led to several spherical motor design concepts. Unfortunately, many of these design concepts suffer certain drawbacks. For example, many exhibit relatively limited torque. This is due, at least in part, to a relatively large air gap between the magnets and inner spherical stator (due in part to the windings) and a relatively heavy spherical stator. The current concepts also exhibit relatively high winding temperatures, relatively complicated and time-consuming winding patterns, Hence, there is a need for a multi-degree-of-freedom electromagnetic machine that at least exhibits improved generated torque, improved thermal handling capabilities, improved speed range, and simpler coil winding configurations as compared to presently known spherical motors. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a multi degree-of-freedom electromagnetic machine includes an outer case, an inner case, a stator, a plurality of stator windings, a voice coil winding, a tilt magnet, a rotor, and a plurality of rotor magnets. The outer case has an inner surface, an outer surface, and an inner cavity formed therein. The inner case is disposed within the inner cavity of the outer case and is mounted to rotate relative to the outer case about at least a first rotational axis. The inner case has an inner surface, an outer surface, and an inner cavity formed therein, and the inner case is at least semi-spherically shaped. The stator is fixedly mounted within the inner case, and has a plurality of radially outwardly extending stator poles. The stator windings are wound around the stator poles and are operable, upon being energized, to generate a magnetic field. The voice coil winding is fixedly coupled to the inner surface of the outer case. The tilt magnet is fixedly coupled to the outer surface of the inner case. The rotor is rotationally mounted within the inner case and surrounds at least a portion of the stator. The rotor is operable to rotate, relative to the stator, about a second rotational axis that is perpendicular to the first rotational axis, and has an inner surface and an outer surface. The rotor magnets are coupled to the inner surface of the rotor.

In another embodiment, a multi-degree of freedom electromagnetic machine, includes an outer case, an inner case, a stator, a plurality of stator windings, a voice coil winding, a tilt magnet, a rotor, and a plurality of rotor magnets. The outer case has an inner surface, an outer surface, and an inner cavity formed therein. The inner case is disposed within the inner cavity of the outer case and is mounted to rotate relative to the outer case about at least a first rotational axis. The inner case has an inner surface, an outer surface, and an inner cavity formed therein, and the inner case is at least semi-spherically shaped. The stator is fixedly mounted within the inner case, and has a plurality of radially outwardly extending stator poles. The stator windings are wound around the stator poles and are operable, upon being energized, to generate a magnetic field. The voice coil winding is wound on the outer surface of the inner case. The tilt magnet is fixedly coupled to the inner surface of the outer case. The rotor is rotationally mounted within the inner case and surrounds at least a portion of the stator. The rotor is operable to rotate, relative to the stator, about a second rotational axis that is perpendicular to the first rotational axis, and has an inner surface and an outer surface. The rotor magnets are coupled to the inner surface of the rotor.

In yet another embodiment, a multi-degree of freedom electromagnetic machine, includes an outer case, an inner case, a rotor, a plurality of rotor magnets, a stator, a plurality of stator windings, a voice coil winding, and a tilt magnet. The outer case has an inner surface, an outer surface, and an inner cavity formed therein. The inner case is disposed within the inner cavity of the outer case and is mounted to rotate relative to the outer case about at least a first rotational axis. The inner case has an inner surface, an outer surface, and an inner cavity formed therein, and the inner case is at least semi-spherically shaped. The rotor is rotationally mounted within the inner case and is operable to rotate, relative to the inner case, about a second rotational axis that is perpendicular to the first rotational axis, and has an inner surface and an outer surface. The rotor magnets are coupled to the outer surface of the rotor. The stator is fixedly mounted to the inner surface of the inner case and surrounds at least a portion of the rotor. The stator has a plurality of radially inwardly extending stator poles. The stator windings are wound around the stator poles and are operable, upon being energized, to generate a magnetic field. The voice coil winding is fixedly coupled to the outer surface of the inner case. The tilt magnet is fixedly coupled to the inner surface of the outer case Furthermore, other desirable features and characteristics of the multi degree-of-freedom electromagnetic machine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
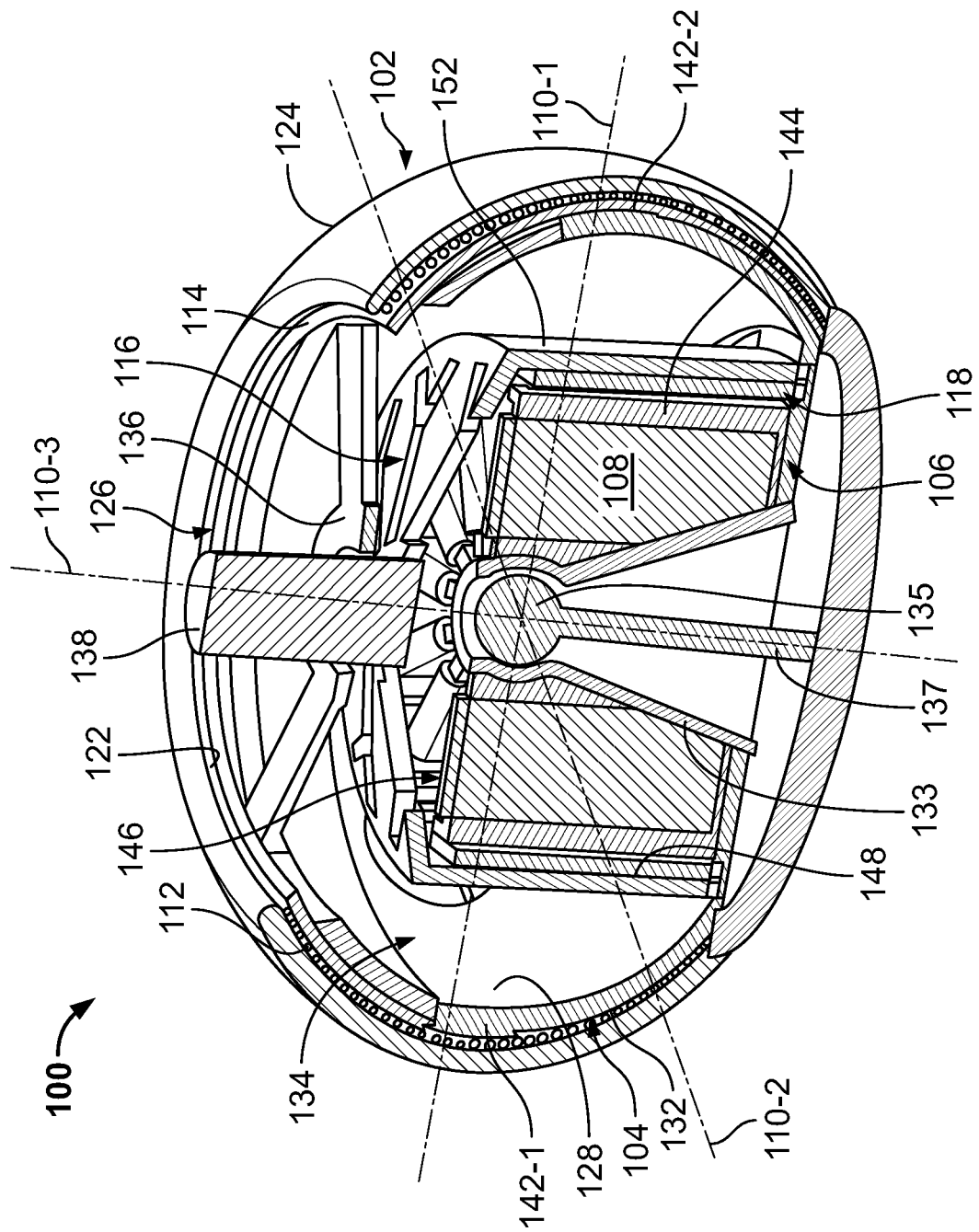
FIG. 1 depicts a cross-sectional plan view of one embodiment of a multi-degree-of-freedom electromagnetic machine.
Figure 2:
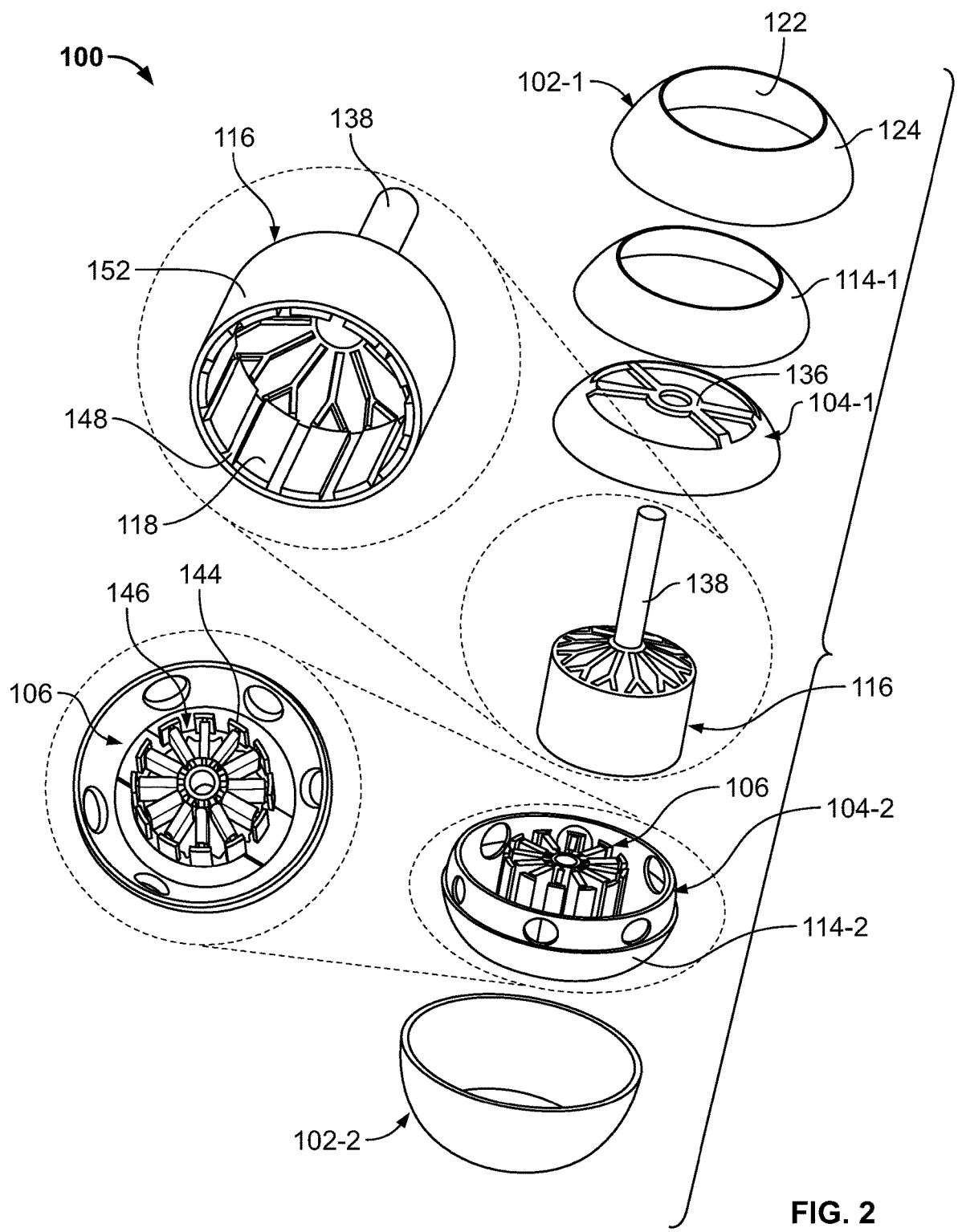
FIG. 2 depicts an exploded view of a portion of the electromagnetic machine depicted in FIG. 1.

Referring to FIGS. 1 and 2, a partial cross-section view and an exploded view, respectively, of one embodiment of a multi-degree-of-freedom electromagnetic machine 100 is depicted. The depicted machine 100 is implemented as a motor and includes at least an outer case 102, an inner case 104, a stator 106, a plurality of stator windings 108, a voice coil winding 112, a tilt magnet 114, a rotor 116, and a plurality of rotor magnets 118.

The outer case 102 has an inner surface 122, an outer surface 124, and an inner cavity 126 formed therein. The outer case 102 is fixedly mounted against rotation using any one of numerous types of non-illustrated, but known, mounting hardware. The outer case 102 is at least semi-spherically shaped and may be formed as a single piece or of multiple pieces. As FIG. 2 illustrates, the depicted outer case 102 is formed of multiple (e.g., 2) pieces—an outer case upper portion 102-1 and an upper case lower portion 102-2. In addition, the outer case 102 may be formed of any one of numerous types of magnetically permeable materials including, but not limited to, iron, low carbon steels, and various alloys (such as Hiperco®).

The inner case 104 is disposed within the inner cavity 126 of the outer case 102 and has an inner surface 128, an outer surface 132, and an inner cavity 134 formed therein. The inner case 104 is mounted to rotate, relative to the outer case 102, about only one axis 110-1 or about the first rotational axis 110-1 and a second rotational axis 110-2. The inner case 104, like the outer case 102, is at least semi-spherically shaped and may be formed as a single piece or of multiple pieces. As FIG. 2 illustrates, the depicted inner case 104 is formed of multiple (e.g., 2) pieces—an inner case upper portion 104-1 and an inner case lower portion 104-2. In addition, the inner case 104 may be formed of any one of numerous types of magnetically permeable materials including, but not limited to, iron, low carbon steels, and various alloys (such as Hiperco®).

The inner case 104, and more specifically the inner case upper portion 104-1, includes a bearing surface 136 that has a non-illustrated bearing disposed therein and through which a shaft 138 extends. Moreover, the inner case 104, and more specifically, the inner case lower portion 104-2, may include a pair of hinge protrusions 142—a first hinge protrusion 142-1 and a second hinge protrusion 142-2—that, when included, are used to rotationally mount the inner case 104 to the outer case 102 to allow rotation of the inner case 104 about the first rotational axis 110-1. In some embodiments, the inner case 104, and more specifically the inner case lower portion 104-2, may not have the hinge protrusions 142, but may instead include a ball joint bearing structure 133. The ball joint bearing structure 133 receives a ball joint 135 that is disposed on an end of a shaft 137 that is fixedly coupled to, and extends radially inwardly from, the outer case 102 or some other structure. The ball joint 135 and ball joint bearing surface 133 allow the inner case 104 to rotate, relative to the outer case 102, about both the first and second rotational axes 110-1, 110-2.

The stator 106 is fixedly mounted within the inner case 104. That is, within the inner cavity 134 of the inner case 104. More specifically, at least in the depicted embodiment, the stator 106 is fixedly mounted within the inner case lower portion 104-2. The stator 106 includes a plurality of radially outwardly extending stator poles 144 that define a plurality of stator slots 146. In the depicted embodiment, the stator 106 includes twelve stator poles 144, and thus twelve stator slots 146. It will be appreciated, however, that the stator 106 could be implemented with more or less than this number of stator poles 144 and stator slots 146.

Regardless of the number of stator poles 144 and stator slots 146, the stator windings 108 are wound around the stator poles 144 and extend through the stator slots 146. The stator windings 108 may be wound in either concentrated or distributed fashion within these slots 146. In the depicted embodiment, it is noted that the stator windings 108 are implemented as 3-phase windings. In other embodiments, however, the distributed stator windings 108 may be implemented with N-number of phases, where N is an integer greater than or less than three. Regardless of the number phases, the stator windings 108 are operable, upon being energized, to generate a magnetic field.

The voice coil winding 112 is fixedly coupled to the inner surface 122 of the outer case 104. Preferably, the voice coil winding 112 is coupled to the inner surface 122 of the outer case 104 via a suitable adhesive such as, for example, various epoxies, Loctite®, or any one of numerous known high-temperature glues.

The tilt magnet 114 is fixedly coupled to the outer surface 132 of the inner case 104. Preferably, the tilt magnet 114 is coupled to the outer surface 132 of the inner case 104 via a suitable adhesive such as, for example, various epoxies, Loctite®, or any one of numerous known high-temperature glues. The tilt magnet 114 may be implemented using a single magnet or multiple magnets or a Halbach array. In the depicted embodiment, the tilt magnet 114 is implemented using a pair of magnets—a first tilt magnet 114-1 and a second tilt magnet 114-2. As FIG. 2 depicts, the first tilt magnet 114-1 is fixedly coupled to the inner case upper portion 104-1 and the second tilt magnet 114-2 is fixedly coupled to the inner case lower portion 104-2.

The rotor 116 is rotationally mounted within the inner case 104 and surrounds at least a portion of the stator 106. The rotor 116 has an inner surface 148 and an outer surface 152 and is operable to rotate, relative to the stator 106, about a third rotational axis 110-3 that is perpendicular to the first and second rotational axes 110-1, 110-2. The rotor 116 is coupled to the shaft 138. Thus, when the rotor 116 rotates about the third rotational axis 110-3, so too does the shaft 138.

The rotor magnets 118 are coupled to the inner surface 148 of the rotor 116. Preferably, the rotor magnets 118 is coupled to the inner surface 148 of the rotor 116 via a suitable adhesive such as, for example, various epoxies, Loctite®, or any one of numerous known high-temperature glues. The number of rotor magnets 118 may vary, but preferably match the number stator poles 144. Thus, in the depicted embodiment, there are twelve rotor magnets 118. As with the stator poles 144, it will be appreciated there could be more or less than this number of rotor magnets 118. Regardless of the specific number, each rotor magnet 118 is preferably arranged such that the polarity of half of the rotor magnets 118 relative to the stator 106 is opposite to the polarity of the other half of the rotor magnets 118. The rotor magnets 118 are disposed such that the magnetic poles facing the stator poles 144 are spaced apart therefrom by a predetermined gap.

The stator windings 108, when energized, cause the rotor 116 (and thus the shaft 138) to rotate, relative to the stator 106, the outer case 102, and the inner case 104, about the third rotational axis 110-3. As may be appreciated, a non-illustrated load, such as a propeller or other device, may be coupled to the shaft 138 to receive the torque supplied therefrom. The voice coil winding 112, depending upon how it is energized (and how the inner case 104 is mounted), causes the inner case 104, and thus the rotor 116 shaft 138, to rotate, relative to the stator 106 and the outer case 102, about one or both of the first and second rotational axes 110-1, 110-2. That is, when the stator windings 108 are energized with alternating current (AC) voltages, a Lorentz force is generated between the stator windings 108 and the rotor magnets 118, which in turn imparts a torque to the rotor 116 (and thus the shaft 138) that causes it to rotate, relative to the stator 106, about the third rotational axis 110-3 (e.g., spin axis). When the voice coil winding 112 is energized with an AC voltage, a Lorentz force is generated between the voice coil winding 112 and the tilt magnet(s) 114, which imparts a torque to inner case 104 (and thus the rotor 116 and shaft 138) that causes it to rotate, relative to the stator 106 and the outer case 102, about one or both of the first and second rotational axes 110-1, 110-2 (e.g., tilt and yaw axes).

In the above-described embodiment, the motor is configured such that the tilt coil 112 remains stationary and the tilt magnet 114 rotates. In other embodiments, the motor may be configured such that the tilt coil rotates, and the tilt magnet remains stationary. Such embodiments is depicted in FIGS. 3-6 and with reference thereto will now be described.

Figure 3:
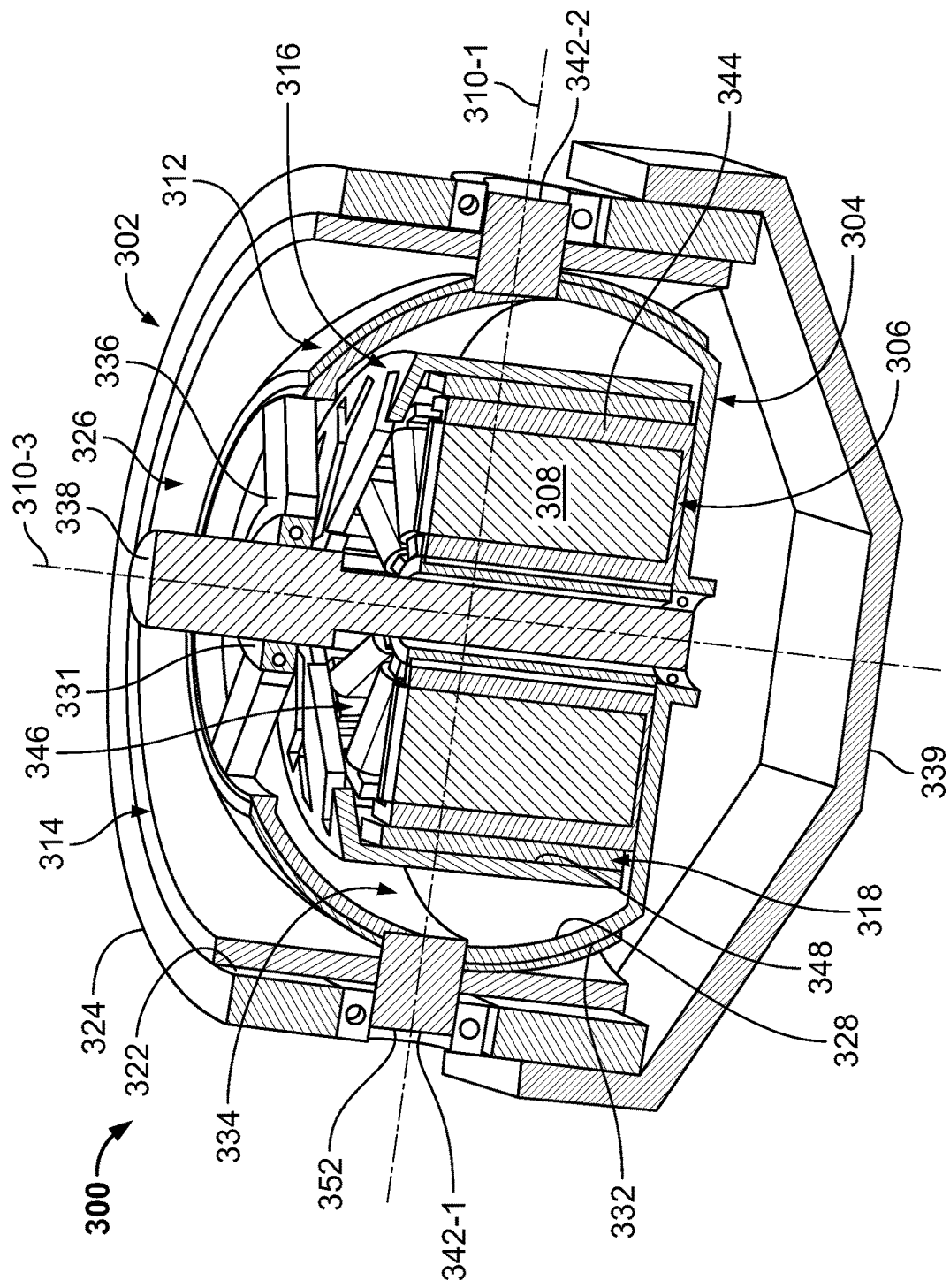
FIG. 3 depicts a cross-sectional plan view of another embodiment of a multi-degree-of-freedom electromagnetic machine.

The multi-degree of freedom electromagnetic machine 300 depicted in FIG. 3, is also configured as a motor, and it too includes at least an outer case 302, an inner case 304, a stator 306, a plurality of stator windings 308, a voice coil winding 312, a tilt magnet 314, a rotor 316, and a plurality of rotor magnets 318.

The outer case 302 has an inner surface 322, an outer surface 324, and an inner cavity 326 formed therein. The outer case 302 is fixedly mounted against rotation using any one of numerous types of non-illustrated, but known, mounting hardware. In this embodiment, the outer case 302 is cylindrically shaped and is formed as a single piece. It will be appreciated that in other embodiments, the outer case 302 may be formed of multiple pieces. The outer case 302 may be formed of any one of numerous types of magnetically permeable materials including, but not limited to, iron, low carbon steels, and various alloys (such as Hiperco®).

Figure 4:
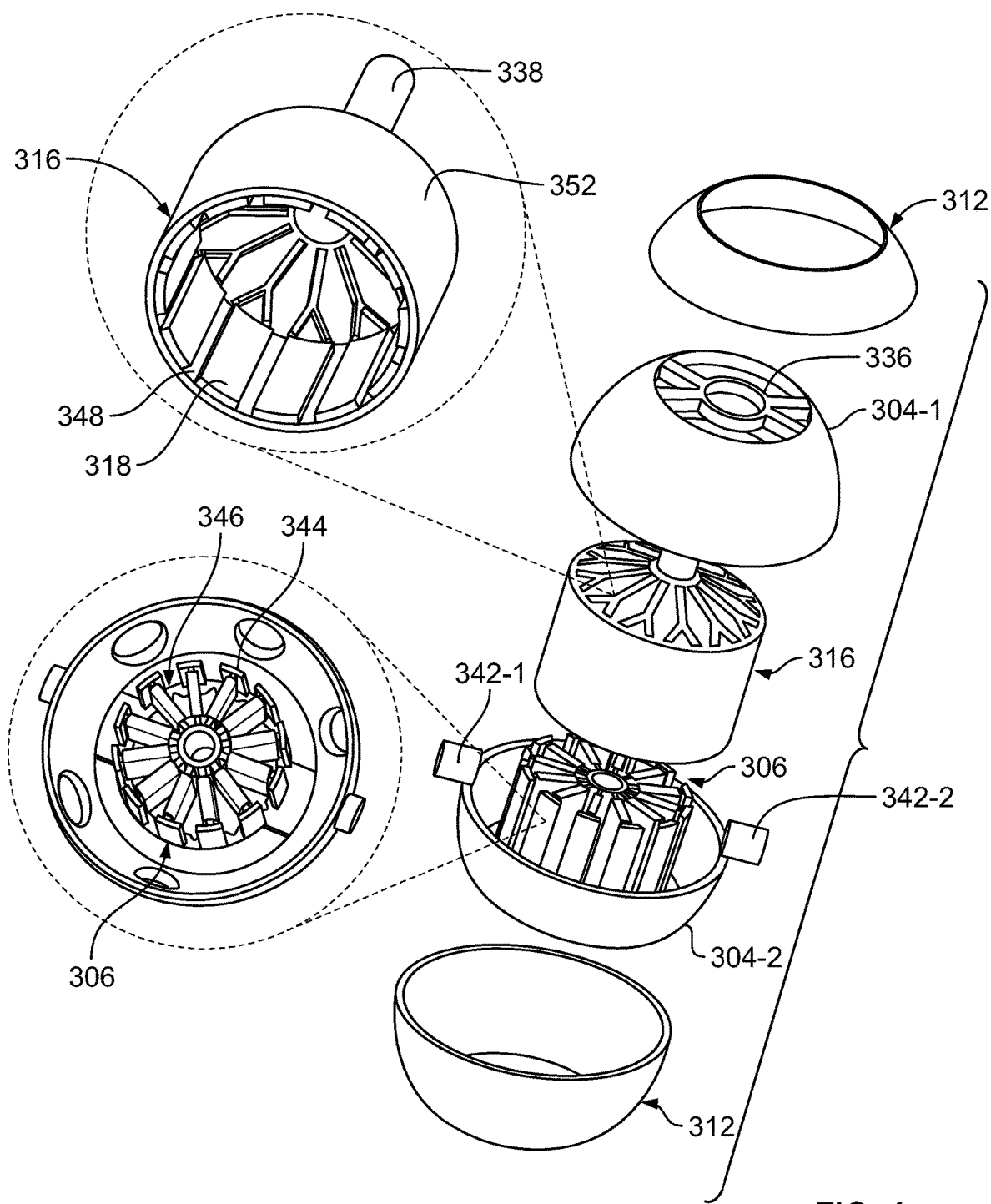
FIG. 4 depicts an exploded view of a portion of the electromagnetic machine depicted in FIG. 3.
Figure 5:
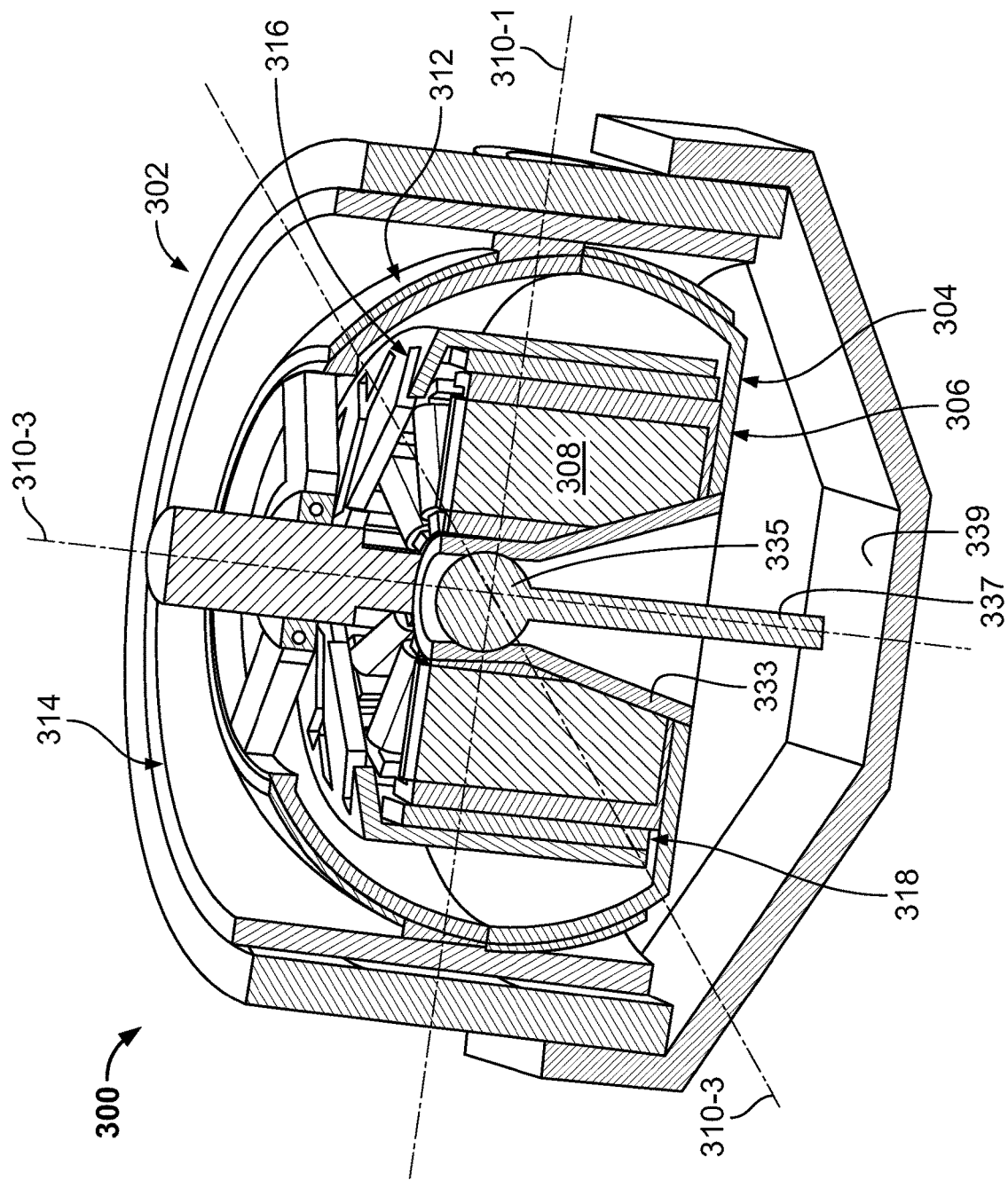
FIG. 5 depicts a cross-sectional plan view of another embodiment of the multi-degree-of-freedom electromagnetic machine depicted in FIG. 3.
Figure 6:
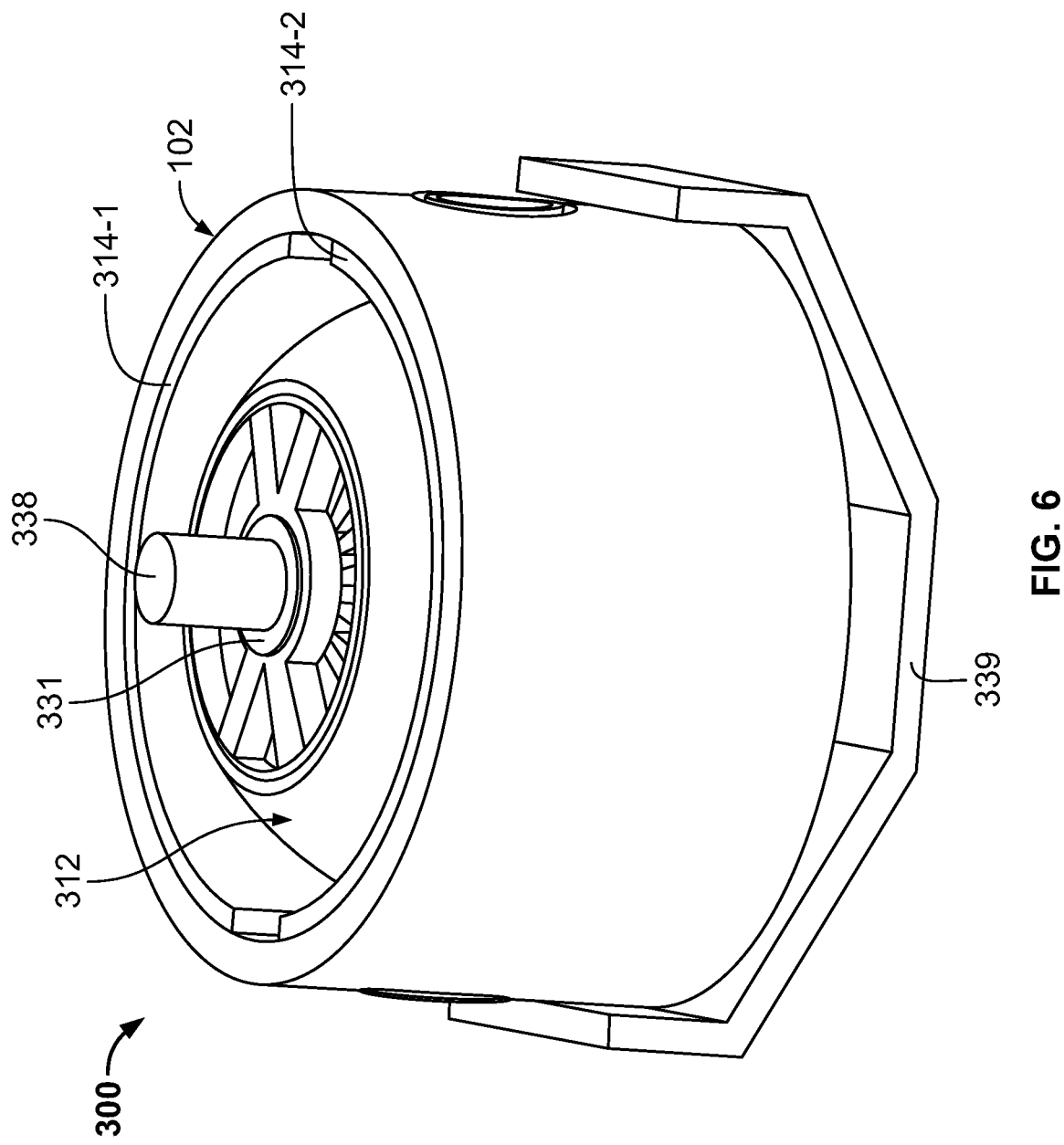
FIG. 6 depicts a plan view of the multi-degree-of-freedom electromagnetic machine depicted in FIG. 3.

The inner case 304 is disposed within the inner cavity 326 of the outer case 302 and has an inner surface 328, an outer surface 332, and an inner cavity 334 formed therein. The inner case 304 is mounted to rotate, relative to the outer case 302, about only a first rotational axis 310-1 (FIG. 3) or about two perpendicular rotational axes—the first rotational axis 310-1 and a second rotational axis 310-2 (FIG. 5). The inner case 304 is at least semi-spherically shaped and may be formed as a single piece or of multiple pieces. As FIG. 4 illustrates, the depicted inner case 304 is formed of multiple (e.g., 2) pieces—an inner case upper portion 304-1 and an inner case lower portion 304-2. In addition, the inner case 304 may be formed of any one of numerous types of magnetically permeable materials including, but not limited to, iron, low carbon steels, and various alloys (such as Hiperco®).

The inner case 304, and more specifically the inner case upper portion 304-1, includes a bearing surface 336 that has a bearing 331 mounted therein and through which a shaft 338 extends. In the embodiment depicted in FIG. 3, the inner case 304, and more specifically, the inner case lower portion 304-2, includes a pair of hinge protrusions 342—a first hinge protrusion 342-1 and a second hinge protrusion 342-2—that are used to rotationally mount the inner case 304 to the outer case 302 to allow rotation of the inner case 304 about the first rotational axis 310-1. In the embodiment depicted in FIG. 5, the inner case 304, and more specifically, the inner case lower portion 304-2 does not include the hinge protrusions 342. Instead, the inner case 304, and more specifically the inner case lower portion 304-2, includes a ball joint bearing structure 333. The ball joint bearing structure 333 receives a ball joint 335 that is disposed on an end of a shaft 337 that is fixedly coupled to, and extends radially inwardly from, a mount structure 339. The ball joint 335 and ball joint bearing surface 333 allow the inner case 304 to rotate, relative to the outer case 302, about both the first and second rotational axes 310-1, 310-2.

The stator 306 is fixedly mounted within the inner case 304. That is, within the inner cavity 334 of the inner case 304. More specifically, at least in the depicted embodiment, the stator 306 is fixedly mounted within the inner case lower portion 304-2. The stator 306 includes a plurality of radially outwardly extending stator poles 344 that define a plurality of stator slots 346. In the depicted embodiment, the stator 306 includes twelve stator poles 344, and thus twelve stator slots 346. It will be appreciated, however, that the stator 306 could be implemented with more or less than this number of stator poles 344 and stator slots 346.

Regardless of the number of stator poles 344 and stator slots 346, the stator windings 308 are wound around the stator poles 344 and extend through the stator slots 346. The stator windings 308 may be wound in either concentrated or distributed fashion within these slots 346. In the depicted embodiment, it is noted that the stator windings 308 are implemented as 3-phase windings. In other embodiments, however, the distributed stator windings 308 may be implemented with N-number of phases, where N is an integer greater than or less than three. Regardless of the number phases, the stator windings 308 are operable, upon being energized, to generate a magnetic field.

The voice coil winding 312 is wound on the outer surface 332 of the inner case 304. Preferably, the voice coil winding 312 is wound on the outer surface 332 of the inner case 304, and it may additionally be adhered thereon via a suitable adhesive such as, for example, various epoxies, Loctite®, or any one of numerous known high-temperature glues.

The tilt magnet 314 is fixedly coupled to the inner surface 322 of the outer case 302. Preferably, the tilt magnet 314 is coupled to the inner surface 322 of the outer case 302 via a suitable adhesive such as, for example, various epoxies, Loctite®, or any one of numerous known high-temperature glues. The tilt magnet 314 may be implemented using a single magnet or multiple magnets or a Halbach array. In the depicted embodiment, the tilt magnet 314 is implemented using a pair of magnets—a first tilt magnet 314-1 and a second tilt magnet 314-2 (only visible in FIG. 6).

The rotor 316 is rotationally mounted within the inner case 304 and surrounds at least a portion of the stator 306. The rotor 316 has an inner surface 348 and an outer surface 352 and is operable to rotate, relative to the stator 306, about a third rotational axis 310-3 that is perpendicular to the first and second rotational axes 310-1, 310-2. The rotor 316 is coupled to the shaft 338. Thus, when the rotor 316 rotates about the third rotational axis 310-3, so too does the shaft 338.

The rotor magnets 318 are coupled to the inner surface 348 of the rotor 316. Preferably, the rotor magnets 318 are coupled to the inner surface 348 of the rotor 316 via a suitable adhesive such as, for example, various epoxies, Loctite®, or any one of numerous known high-temperature glues. The number of rotor magnets 318 may vary, but preferably match the number stator poles 344. Thus, in the depicted embodiment, there are twelve rotor magnets 318. As with the stator poles 344, it will be appreciated there could be more or less than this number of rotor magnets 318. Regardless of the specific number, each rotor magnet 318 is preferably arranged such that the polarity of half of the rotor magnets 318 relative to the stator 306 is opposite to the polarity of the other half of the rotor magnets 318. The rotor magnets 318 are disposed such that the magnetic poles facing the stator poles 344 are spaced apart therefrom by a predetermined gap.

The stator windings 308, when energized, cause the rotor 316 (and thus the shaft 338) to rotate, relative to the stator 306, the outer case 302, and the inner case 304, about the third rotational axis 310-3. As may be appreciated, a non-illustrated load, such as a propeller or other device, may be coupled to the shaft 338 to receive the torque supplied therefrom. The voice coil winding 312, depending upon how it is energized (and how the inner case 304 is mounted), causes the inner case 304 (and thus the rotor 316 and the shaft 338) and to rotate, relative to the stator 306 and the outer case 302, about one or both of the first and second rotational axes 310-1, 310-2. That is, when the stator windings 308 are energized with alternating current (AC) voltages, a Lorentz force is generated between the stator windings 308 and the rotor magnets 318, which in turn imparts a torque to the rotor 316 (and thus the shaft 338) that causes it to rotate, relative to the stator 306, about the third rotational axis 310-3 (e.g., spin axis). When the voice coil winding 312 is energized with an AC voltage, a Lorentz force is generated between the voice coil winding 312 and the tilt magnet(s) 314, which imparts a torque to the inner case 304 that causes it (and thus the rotor 316 and the shaft 338) to rotate, relative to the stator 306 and the outer case 302, about one or both of the first and second rotational axes 310-1, 310-2 (e.g., tilt and yaw axes).

In the above-described embodiments, the motors are configured with the rotor surrounding (or at least partially surrounding) the stator. Such a configuration may be referred to as an "out-runner" configuration. In another embodiment, which may be referred to as an "in-runner" configuration, the stator surrounds (or at least partially surrounds) the rotor. Such an embodiment is depicted in FIGS. 7-11 and with reference thereto will now be described.

Figure 7:
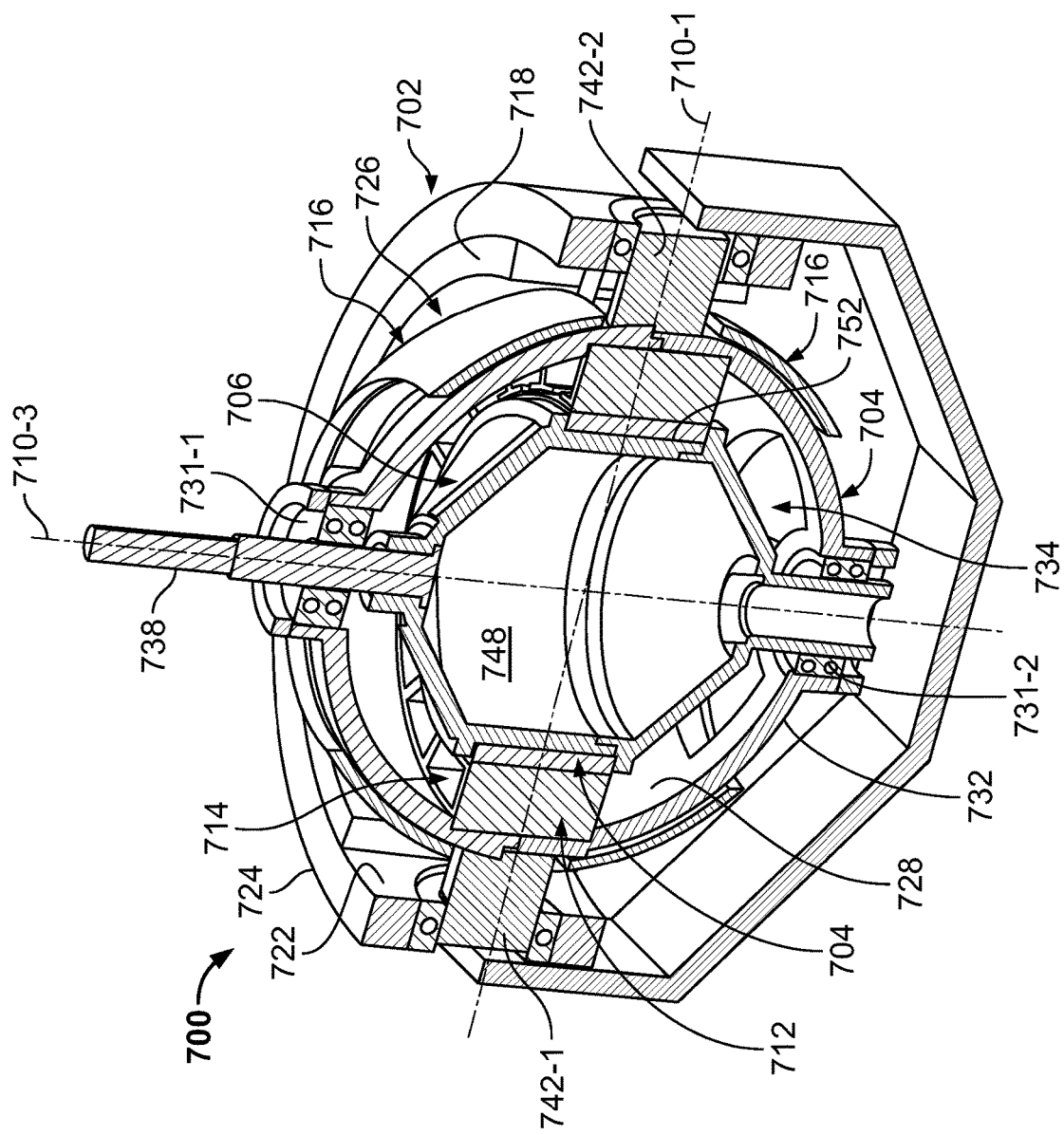
FIG. 7 depicts a cross-sectional plan view of another embodiment of a multi-degree-of-freedom electromagnetic machine.

The multi-degree of freedom electromagnetic machine 700 depicted in FIG. 7, is also configured as a motor, and includes at least an outer case 702, an inner case 704, a rotor 706, a plurality of rotor magnets 708, a stator 712, a plurality of stator windings 714, a voice coil winding 716, and a tilt magnet 718.

The outer case 702 has an inner surface 722, an outer surface 724, and an inner cavity 726 formed therein. The outer case 702 is fixedly mounted against rotation using any one of numerous types of non-illustrated, but known, mounting hardware. In this embodiment, the outer case 702 is cylindrically shaped and is formed as a single piece. It will be appreciated that in other embodiments, the outer case 702 may be formed of multiple pieces. The outer case 702 may be formed of any one of numerous types of materials including, but not limited to magnetically permeable materials including, but not limited to, iron, low carbon steels, and various alloys (such as Hiperco®).

Figure 8:
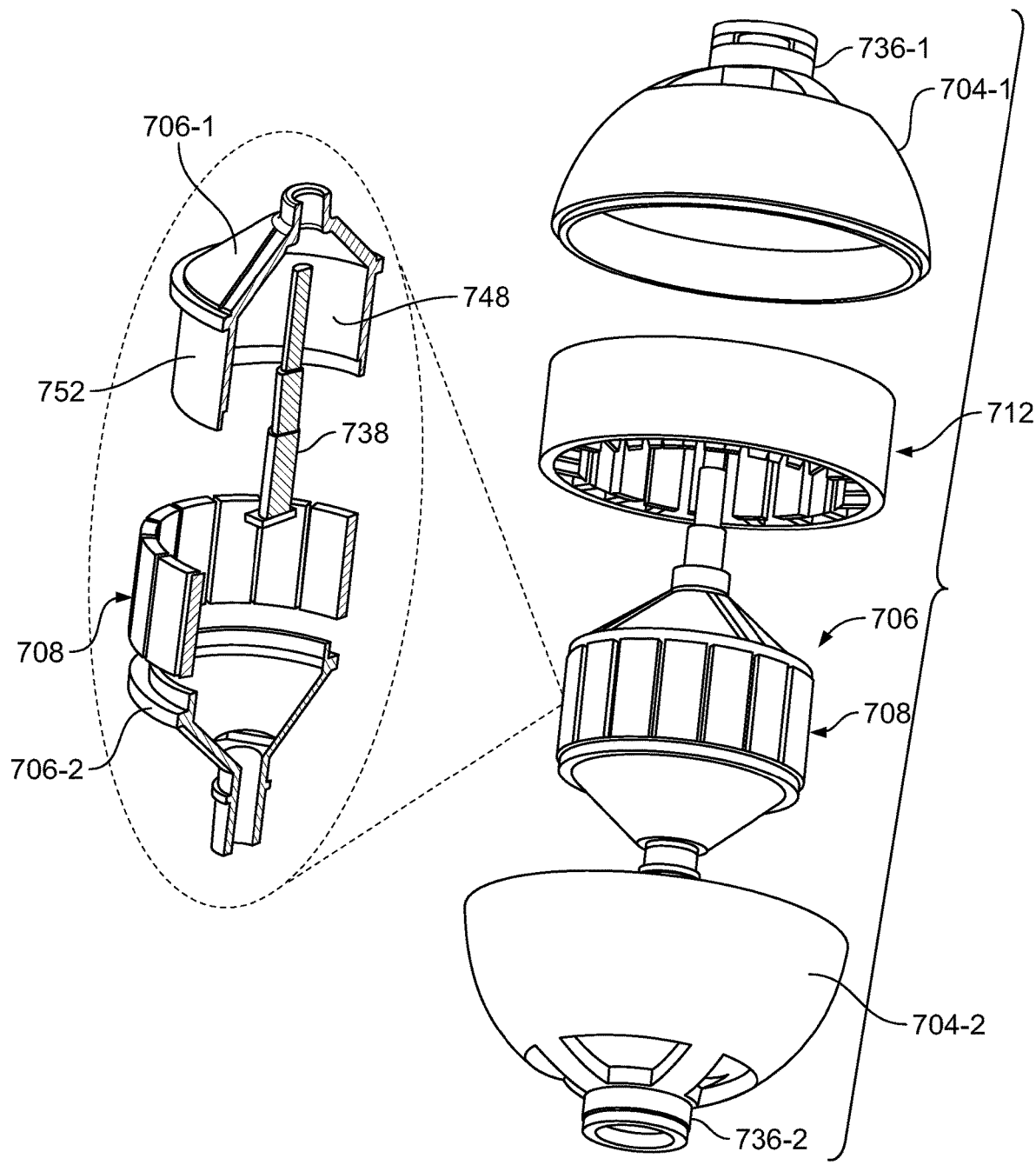
FIG. 8 depicts an exploded view of a portion of the electromagnetic machine depicted in FIG. 7.
Figure 9:
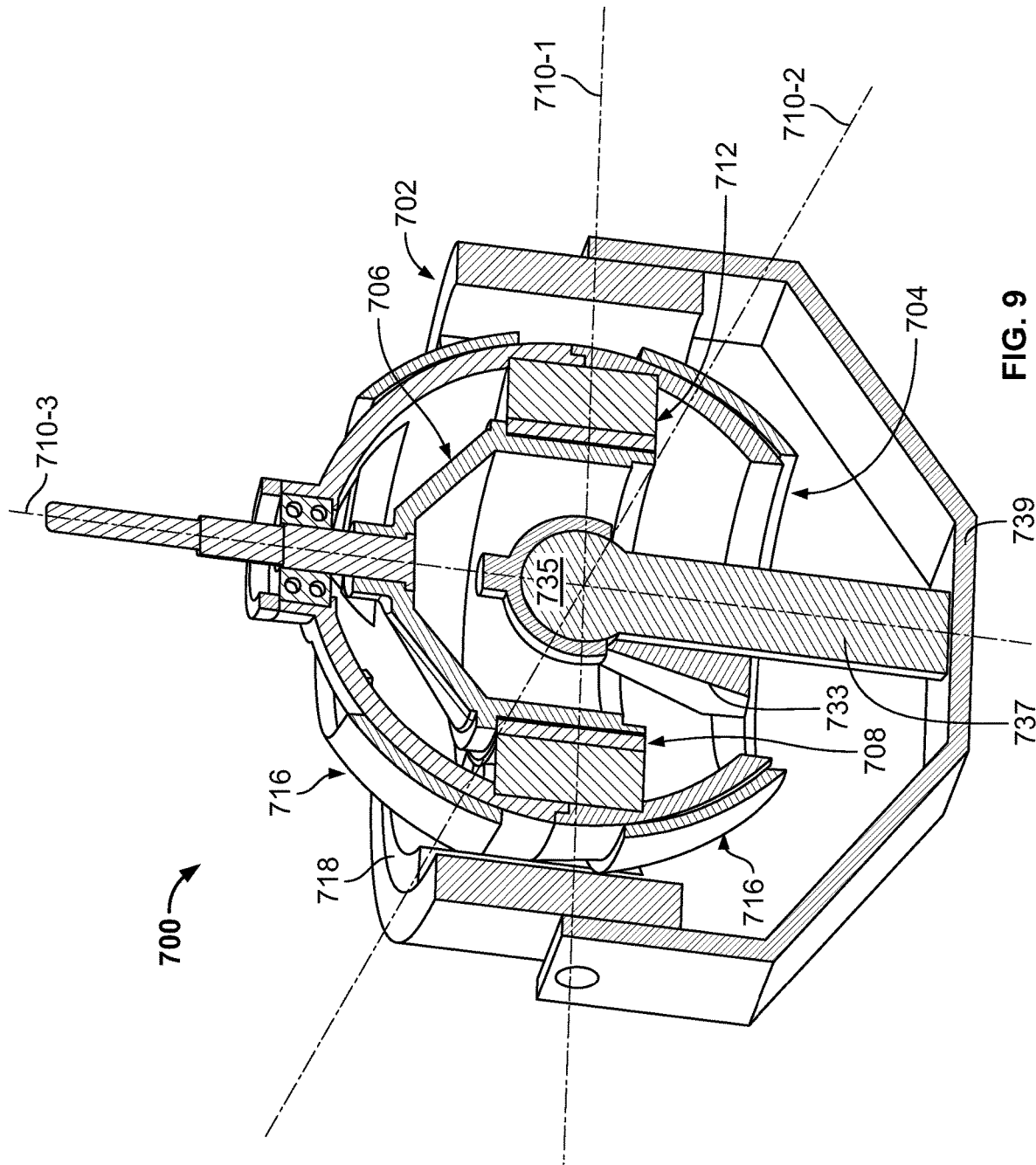
FIG. 9 depicts a cross-sectional plan view of another embodiment of the multi-degree-of-freedom electromagnetic machine depicted in FIG. 7.

The inner case 704 is disposed within the inner cavity 726 of the outer case 702 and has an inner surface 728, an outer surface 732, and an inner cavity 734 formed therein. The inner case 704 is mounted to rotate, relative to the outer case 702, about only a first rotational axis 710-1 (FIG. 7) or about two perpendicular rotational axes—the first rotational axis 710-1 and a second rotational axis 710-2 (FIG. 9). The inner case 704 is at least semi-spherically shaped and may be formed as a single piece or of multiple pieces. As FIG. 8 illustrates, the depicted inner case 704 is formed of multiple (e.g., 2) pieces—an inner case upper portion 704-1 and an inner case lower portion 704-2. In addition, the inner case 704 may be formed of any one of numerous types of magnetically permeable materials including, but not limited to, iron, low carbon steels, and various alloys (such as Hiperco®).

The inner case upper portion 704-1 includes a first bearing surface 736-1 that has a first bearing 731-1 disposed therein and through which a shaft 738 extends, and the inner case lower portion 704-2 includes a second bearing surface 736-2 that has a second bearing 731-2 disposed therein and through which a portion of the rotor 704 extends. In the embodiment depicted in FIG. 9, the inner case 704 has a pair of hinge protrusions 742—a first hinge protrusion 742-1 and a second hinge protrusion 742-2—coupled thereto and that are used to rotationally mount the inner case 704 to the outer case 702 to allow rotation of the inner case 704 about the first rotational axis 710-1. In the embodiment depicted in FIG. 9, the inner case 704, and more specifically, the inner case lower portion 704-2, may not include the hinge protrusions 742, but instead includes a ball joint bearing structure 733. The ball joint bearing structure 733 receives a ball joint 735 that is disposed on an end of a shaft 737 that is fixedly coupled to, and extends radially inwardly from, a mount structure 739. The ball joint 735 and ball joint bearing surface 733 allow the inner case 704 to rotate, relative to the outer case 702, about both the first and second rotational axes 710-1, 710-2.

The rotor 706 is rotationally mounted within the inner case 704 and has an inner surface 748 and an outer surface 752. The rotor 706 and is operable to rotate, relative to the inner case 704, about a third rotational axis 710-3 that is perpendicular to the first and second rotational axes 710-1, 710-2. The rotor 706 is coupled to the shaft 738. Thus, when the rotor 706 rotates about the third rotational axis 710-3, so too does the shaft 738. As FIG. 8 illustrates, the depicted rotor 706 is formed of multiple (e.g., 2) pieces—an rotor upper portion 706-1 and an rotor lower portion 706-2.

The rotor magnets 708 are coupled to the outer surface 752 of the rotor 706. Preferably, the rotor magnets 708 are coupled to the outer surface 752 of the rotor 706 via a suitable adhesive such as, for example, various epoxies, Loctite®, or any one of numerous known high-temperature glues. The number of rotor magnets 718 may vary, but preferably match the number stator poles (described below). Regardless of the specific number, each rotor magnet 708 is preferably arranged such that the polarity of half of the rotor magnets 708 relative to the stator 712 is opposite to the polarity of the other half of the rotor magnets 708. The rotor magnets 708 are disposed such that the magnetic poles facing the stator poles are spaced apart therefrom by a predetermined gap.

Figure 10:
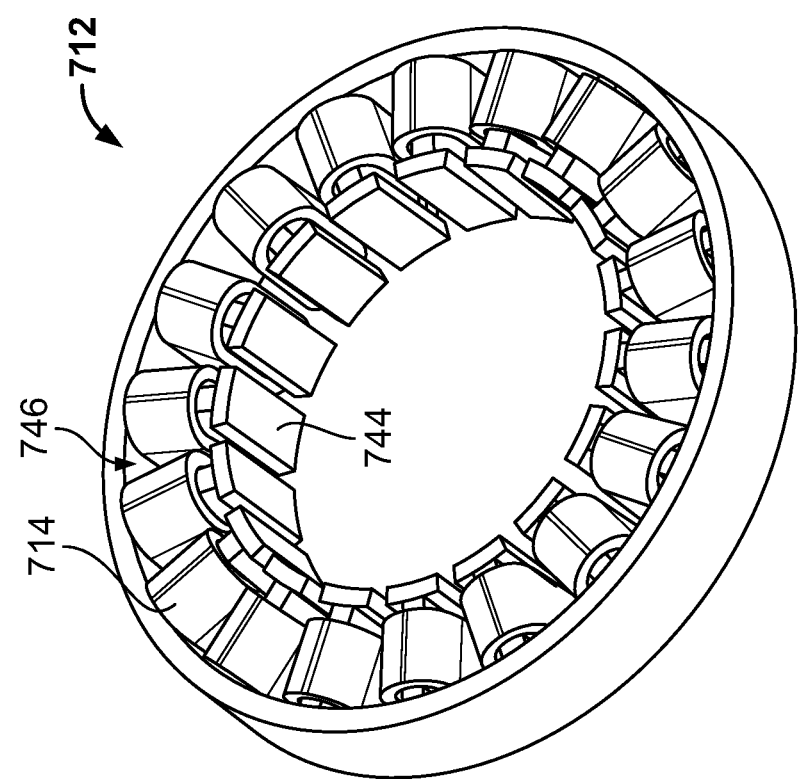
FIG. 10 depicts a plan view of a stator that may be included in the multi-degree-of-freedom electromagnetic machine depicted in FIGS. 7 and 9.

The stator 712, an embodiment of which is shown most clearly in FIG. 10, is fixedly mounted to the inner surface 728 of the inner case 704 and surrounds at least a portion of the rotor 706. The stator 712 has a plurality of radially inwardly extending stator poles 744 that define a plurality of stator slots 746. In the depicted embodiment, the stator 712 includes 18 stator poles 744, and thus 18 stator slots 746. It will be appreciated, however, that the stator 712 could be implemented with more or less than this number of stator poles 744 and stator slots 746.

Regardless of the number of stator poles 744 and stator slots 746, the stator windings 714 are wound around the stator poles 744 and extend through the stator slots 746. The stator windings 714 may be wound in either concentrated or distributed fashion within these slots 746. In the depicted embodiment, it is noted that the stator windings 714 are implemented as 3-phase windings. In other embodiments, however, the distributed stator windings 714 may be implemented with N-number of phases, where N is an integer greater than or less than three. Regardless of the number phases, the stator windings 714 are operable, upon being energized, to generate a magnetic field.

The voice coil winding 716 is wound on the outer surface 732 of the inner case 704. Preferably, the voice coil winding 716 is wound on the outer surface 732 of the inner case 704, and it may additionally be adhered thereon via a suitable adhesive such as, for example, various epoxies, Loctite®, or any one of numerous known high-temperature glues.

Figure 11:
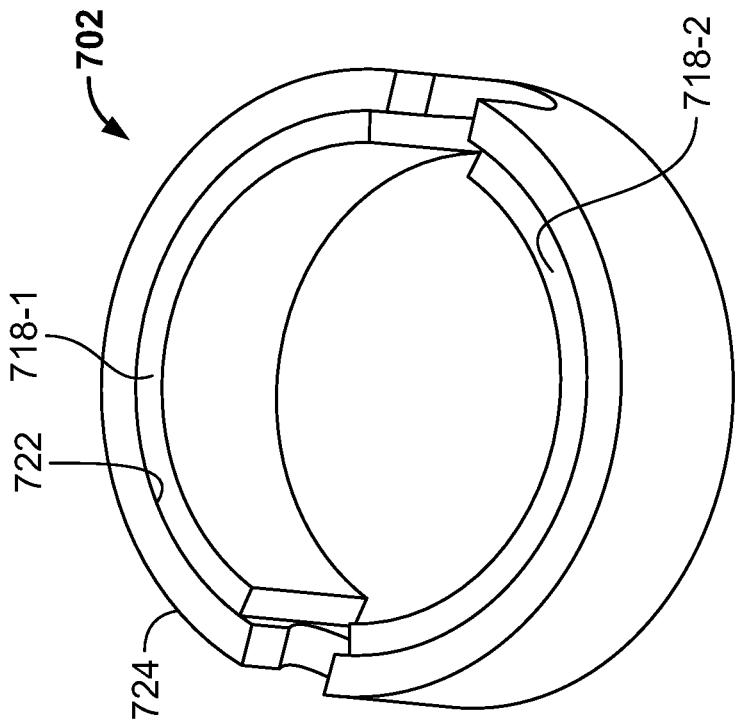
FIG. 11 depicts a plan view of an outer case and magnets that may be included in the multi-degree-of-freedom electromagnetic machine depicted in FIGS. 7 and 9.

The tilt magnet 718 in FIG. 11 is fixedly coupled to the inner surface 722 of the outer case 702. Preferably, the tilt magnet 718 is coupled to the inner surface 722 of the outer case 702 via a suitable adhesive such as, for example, various epoxies, Loctite®, or any one of numerous known high-temperature glues. The tilt magnet 718 may be implemented using a single magnet or multiple magnets. In the depicted embodiment, the tilt magnet 718 is implemented using a pair of magnets—a first tilt magnet 718-1 and a second tilt magnet 718-2.

The stator windings 714, when energized, cause the rotor 706 (and thus the shaft 738) to rotate, relative to the stator 712, the outer case 702, and the inner case 704, about the third rotational axis 710-3. As may be appreciated, a non-illustrated load, such as a propeller or other device, may be coupled to the shaft 738 to receive the torque supplied therefrom. The voice coil winding 716, depending upon how it is energized (and how the inner case 704 is mounted), causes the inner case 704 (and thus the rotor 706 and the shaft 738) and to rotate, relative to the stator 712 and the outer case 704, about one or both of the first and second rotational axes 310-1, 310-2. That is, when the stator windings 714 are energized with alternating current (AC) voltages, a Lorentz force is generated between the stator windings 714 and the rotor magnets 708, which in turn imparts a torque to the rotor 706 (and thus the shaft 738) that causes it to rotate, relative to the stator 712, about the third rotational axis 310-3 (e.g., spin axis). When the voice coil winding 716 is energized with an AC voltage, a Lorentz force is generated between the voice coil winding 716 and the tilt magnet(s) 718, which imparts a torque to the inner case 704 that causes it (and thus the rotor 706 and the shaft 738) to rotate, relative to the stator 712 and the outer case 702, about one or both of the first and second rotational axes 710-1, 710-2 (e.g., tilt and yaw axes).

Figure 12:
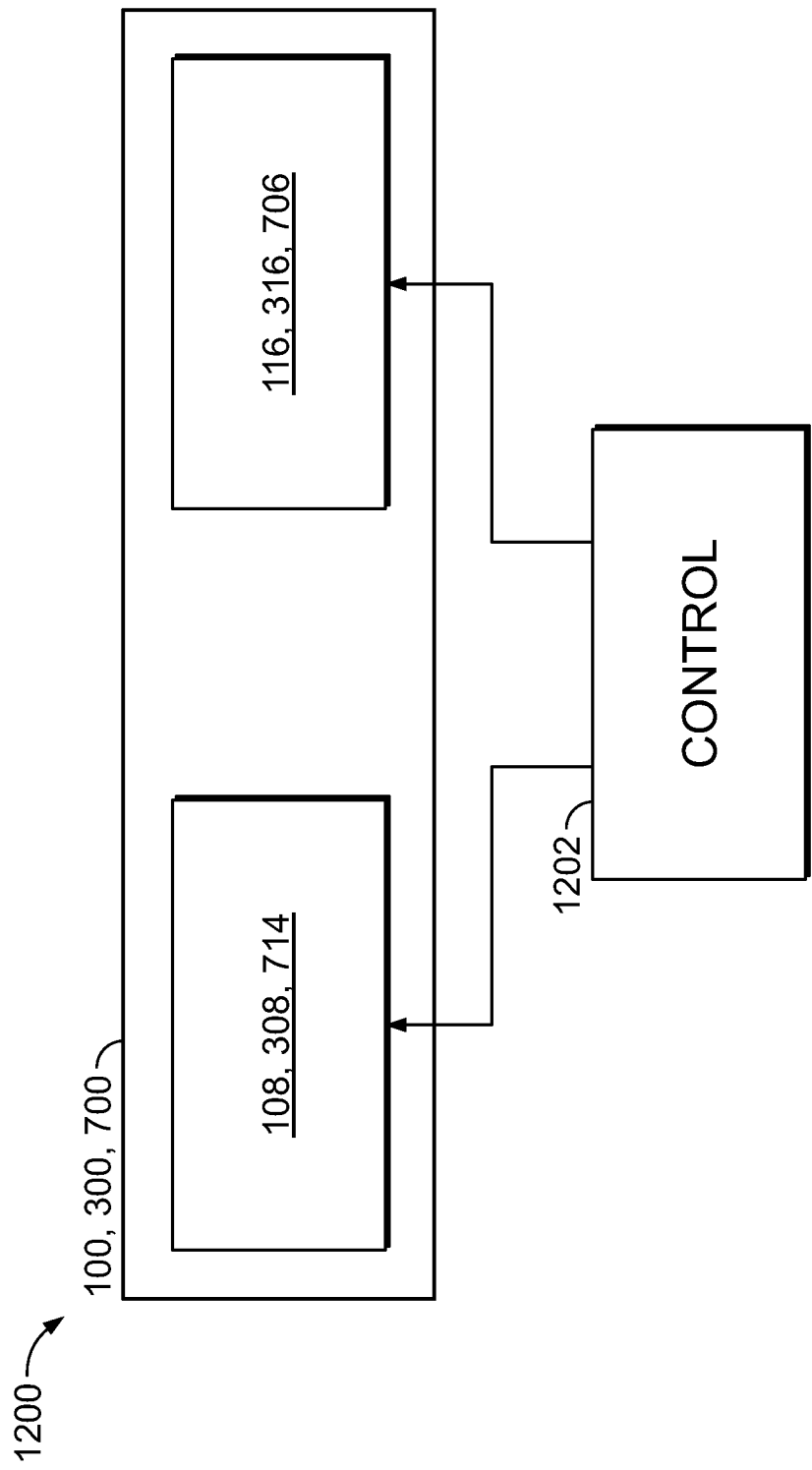
FIG. 12 depicts a functional block diagram of a multi-degree-of-freedom control system.

Referring now to FIG. 12, a functional block diagram of a multi-degree-of-freedom control system 1200 that includes any of the machines 100, 300, 700 described herein is depicted. As FIG. 12 depicts, the system 1200 includes a control 1202 that is coupled to each of the stator windings 108, 308, 714 and to the voice coil winding 112, 312, 716. The control 1202 is configured to control the current magnitudes and directions in the stator windings 108, 308, 714 and the voice coil winding 112, 312, 716 to thereby control the rotational speed and direction of the rotor 116, 316, 706 and the inner case 104, 304, 704. The control 1202 may be configured to implement this functionality using either open-loop control or closed-loop control. Open-loop control provides relatively lower cost, less complexity, relatively simple DC operation, and relatively lower size and weight. Closed-loop control provides higher accuracy and precision, higher bandwidth, and autonomous control. Various control techniques could be implemented in the control 902. Some non-limiting examples of suitable control techniques include PWM control and back EMF control.

The multi-degree-of-freedom electromagnetic machines disclosed herein exhibit several advantages over many presently known spherical motors. Some of these advantages include, but are not limited to, relatively higher spin torque, improved thrust-to-weight ratio, increased thermal efficiency and improved performance, better controllability, reduced cogging with smooth transition steps, and improved stability since the center of gravity (CG) of the rotors are at the center of the machines.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, magnetically electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A multi-degree-of-freedom electromagnetic machine, comprising:
   an outer case having an inner surface, an outer surface, and an inner cavity formed therein;
   an inner case disposed within the inner cavity of the outer case and mounted to rotate relative to the outer case about at least a first rotational axis, the inner case having an inner surface, an outer surface, and an inner cavity formed therein, the inner case being at least semi-spherically shaped;
   a stator fixedly mounted within the inner case, and having a plurality of radially outwardly extending stator poles;
   a plurality of stator windings wound around the stator poles and operable, upon being energized, to generate a magnetic field;
   a voice coil winding fixedly coupled to the inner surface of the outer case;
   a tilt magnet fixedly coupled to the outer surface of the inner case;
   a rotor rotationally mounted within the inner case and surrounding at least a portion of the stator, the rotor operable to rotate, relative to the stator, about a second rotational axis that is perpendicular to the first rotational axis, the rotor having an inner surface and an outer surface; and
   a plurality of rotor magnets coupled to the inner surface of the rotor.

2. The multi-degree-of-freedom electromagnetic machine of claim 1, further comprising:
   a first hinge protrusion extending from the inner case and rotationally coupled to the outer case; and
   a second hinge protrusion extending from the inner case and rotationally coupled to the outer case,
   wherein the first and second hinge protrusions rotationally mount the inner case to the outer case to allow rotation of the inner case about the first rotational axis.

3. The multi-degree-of-freedom electromagnetic machine of claim 2, wherein:
   the voice coil winding, when electrically energized, imparts a torque on the inner case that causes the inner case to rotate, relative to the stator and the outer case, about the first rotational axis; and
   the plurality of stator windings, when electrically energized, impart a torque on the rotor that causes the rotor to rotate, relative to the stator, the outer case, and the inner case, about the second rotational axis.

4. The multi degree-of-freedom electromagnetic machine of claim 1, further comprising:
   a ball joint bearing structure coupled to the inner case and extending into the inner cavity of the inner case;
   a ball joint disposed within the ball joint bearing structure; and
   a shaft coupled to the ball joint and fixedly coupled against movement,
   wherein the ball joint and ball joint bearing structure allow the inner case to rotate, relative to the outer case, about the first rotational axis and a third rotational axis, the third rotational axis perpendicular to the first and second rotational axes.

5. The multi-degree-of-freedom electromagnetic machine of claim 4, wherein:
   the voice coil winding, when electrically energized, imparts a torque on the inner case that causes the inner case to rotate, relative to the stator and the outer case, about one or both of the first rotational axis and the third rotational axis; and
   the plurality of stator windings, when electrically energized, impart a torque on the rotor that causes the rotor to rotate, relative to the stator, the outer case, and the inner case, about the second rotational axis.

6. The multi-degree-of-freedom electromagnetic machine of claim 1, further comprising:
   a control coupled to the plurality of stator windings and to the voice coil winding, the control configured to control current magnitudes in the plurality of stator windings and in the voice coil winding to thereby control rotation of the rotor and the inner case.

7. The multi-degree-of-freedom electromagnetic machine of claim 6, wherein the control is configured to supply the plurality of stator windings and the voice coil winding with alternating current (AC) voltages.

8. A multi-degree of freedom electromagnetic machine, comprising:
   an outer case having an inner surface, an outer surface, and an inner cavity formed therein;

an inner case disposed within the inner cavity of the outer case and mounted to rotate relative to the outer case about at least a first rotational axis, the inner case having an inner surface, an outer surface, and an inner cavity formed therein, the inner case being at least semi-spherically shaped;

a stator fixedly mounted within the inner case, and having a plurality of radially outwardly extending stator poles;

a plurality of stator windings wound around the stator poles and operable, upon being energized, to generate a magnetic field;

a voice coil winding wound on the outer surface of the inner case;

a tilt magnet fixedly coupled to the inner surface of the outer case;

a rotor rotationally mounted within the inner case and surrounding at least a portion of the stator, the rotor operable to rotate, relative to the stator, about a second rotational axis that is perpendicular to the first rotational axis, the rotor having an inner surface and an outer surface; and a plurality of rotor magnets coupled to the inner surface of the rotor.

9. The multi-degree-of-freedom electromagnetic machine of claim 8, further comprising:

a first hinge protrusion extending from the inner case and rotationally coupled to the outer case; and a second hinge protrusion extending from the inner case and rotationally coupled to the outer case, wherein the first and second hinge protrusions rotationally mount the inner case to the outer case to allow rotation of the inner case about the first rotational axis.

10. The multi-degree-of-freedom electromagnetic machine of claim 9, wherein:

the voice coil winding, when electrically energized, imparts a torque on the inner case that causes the inner case to rotate, relative to the stator and the outer case, about the first rotational axis; and the plurality of stator windings, when electrically energized, impart a torque on the rotor that causes the rotor to rotate, relative to the stator, the outer case, and the inner case, about the second rotational axis.

11. The multi degree-of-freedom electromagnetic machine of claim 8, further comprising:

a ball joint bearing structure coupled to the inner case and extending into the inner cavity of the inner case;

a ball joint disposed within the ball joint bearing structure; and a shaft coupled to the ball joint and fixedly coupled against movement, wherein the ball joint and ball joint bearing structure allow the inner case to rotate, relative to the outer case, about the first rotational axis and a third rotational axis, the third rotational axis perpendicular to the first and second rotational axes.

12. The multi-degree-of-freedom electromagnetic machine of claim 11, wherein:

the voice coil winding, when electrically energized, imparts a torque on the inner case that causes the inner case to rotate, relative to the stator and the outer case, about one or both of the first rotational axis and the third rotational axis; and the plurality of stator windings, when electrically energized, impart a torque on the rotor that causes the rotor to rotate, relative to the stator, the outer case, and the inner case, about the second rotational axis.

13. The multi-degree-of-freedom electromagnetic machine of claim 8, further comprising:

a control coupled to the plurality of stator windings and to the voice coil winding, the control configured to control current magnitudes in the plurality of stator windings and in the voice coil winding to thereby control rotation of the rotor and the inner case.

14. The multi-degree-of-freedom electromagnetic machine of claim 13, wherein the control is configured to supply the plurality of stator windings and the voice coil winding with alternating current (AC) voltages.

15. A multi-degree of freedom electromagnetic machine, comprising:

an outer case having an inner surface, an outer surface, and an inner cavity formed therein;

an inner case disposed within the inner cavity of the outer case and mounted to rotate relative to the outer case about at least a first rotational axis, the inner case having an inner surface, an outer surface, and an inner cavity formed therein, the inner case being at least semi-spherically shaped;

a rotor rotationally mounted within the inner case and operable to rotate, relative to the inner case, about a second rotational axis that is perpendicular to the first rotational axis, the rotor having an inner surface and an outer surface;

a plurality of rotor magnets coupled to the outer surface of the rotor;

a stator fixedly mounted to the inner surface of the inner case and surrounding at least a portion of the rotor, the stator having a plurality of radially inwardly extending stator poles;

a plurality of stator windings wound around the stator poles and operable, upon being energized, to generate a magnetic field;

a voice coil winding fixedly coupled to the outer surface of the inner case; and a tilt magnet fixedly coupled to the inner surface of the outer case.

16. The multi-degree-of-freedom electromagnetic machine of claim 15, further comprising:

a first hinge protrusion extending from the inner case and rotationally coupled to the outer case; and a second hinge protrusion extending from the inner case and rotationally coupled to the outer case, wherein the first and second hinge protrusions rotationally mount the inner case to the outer case to allow rotation of the inner case about the first rotational axis.

17. The multi-degree-of-freedom electromagnetic machine of claim 16, wherein:

the voice coil winding, when electrically energized, imparts a torque on the inner case that causes the inner case to rotate, relative to the stator and the outer case, about the first rotational axis; and the plurality of stator windings, when electrically energized, impart a torque on the rotor that causes the rotor to rotate, relative to the stator, the outer case, and the inner case, about the second rotational axis.

18. The multi degree-of-freedom electromagnetic machine of claim 15, further comprising:

a ball joint bearing structure coupled to the inner case and extending into the inner cavity of the inner case;

a ball joint disposed within the ball joint bearing structure; and a shaft coupled to the ball joint and fixedly coupled against movement, wherein the ball joint and ball joint bearing structure allow the inner case to rotate, relative to the outer case, about the first rotational axis and a third rotational axis, the third rotational axis perpendicular to the first and second rotational axes.

19. The multi-degree-of-freedom electromagnetic machine of claim 18, wherein:
the voice coil winding, when electrically energized, imparts a torque on the inner case that causes the inner case to rotate, relative to the stator and the outer case, about one or both of the first rotational axis and the third rotational axis; and
the plurality of stator windings, when electrically energized, impart a torque on the rotor that causes the rotor to rotate, relative to the stator, the outer case, and the inner case, about the second rotational axis.

20. The multi-degree-of-freedom electromagnetic machine of claim 15, further comprising:
a control coupled to the plurality of stator windings and to the voice coil winding, the control configured to control current magnitudes in the plurality of stator windings and in the voice coil winding to thereby control rotation of the rotor and the inner case,
wherein the control is configured to supply the plurality of stator windings and the voice coil winding with alternating current (AC) voltages.

\* \* \* \* \*